March 14, 1939. W. J. HYATT 2,150,604
TANDEM AXLE HOOK-UP
Filed Feb. 5, 1938 3 Sheets-Sheet 1
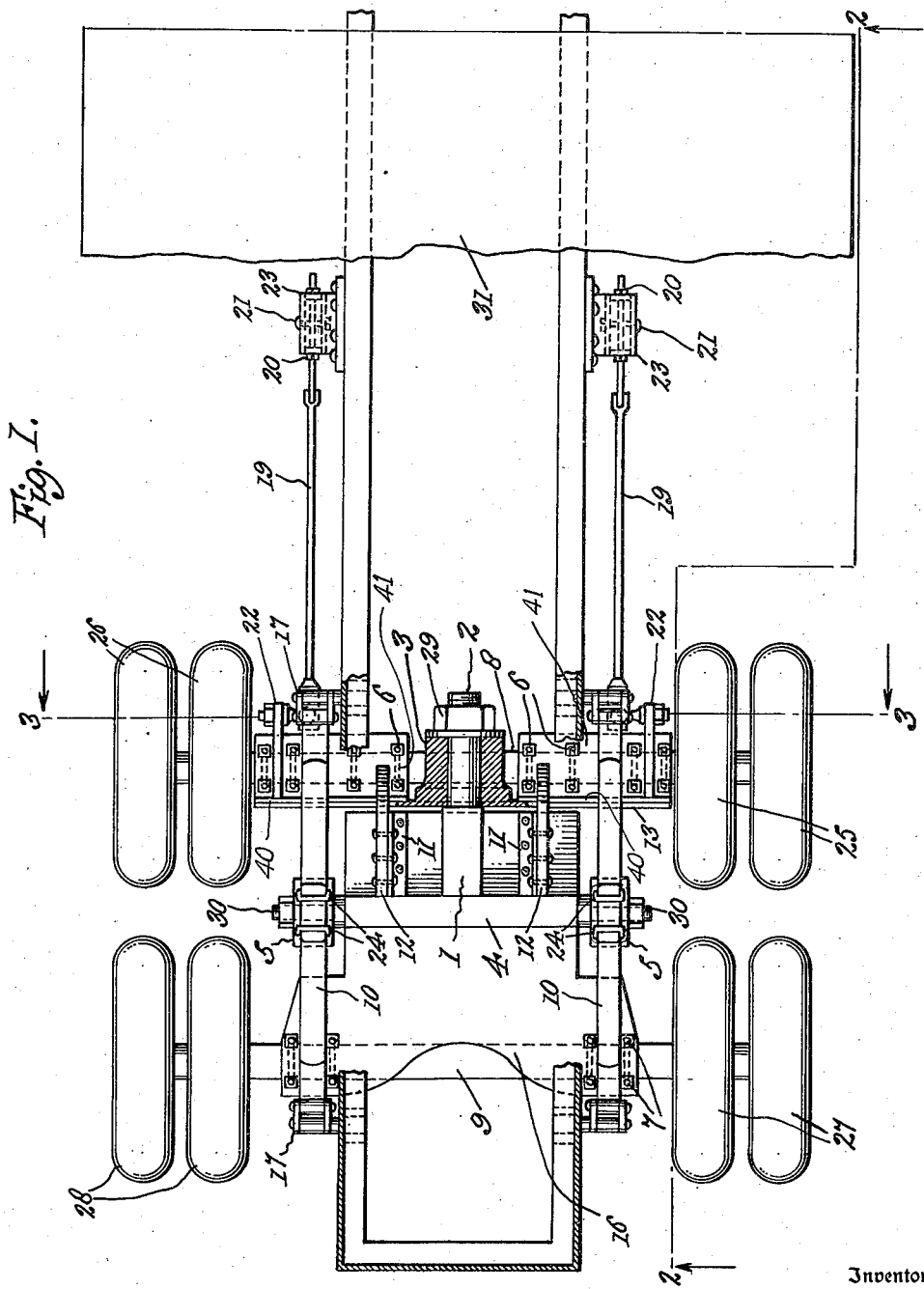
Fig. I.
Inventor
Wilbert J. Hyatt
By Wilkinson & Mawhinney
Attorneys March 14, 1939. W. J. HYATT 2,150,604
TANDEM AXLE HOOK-UP
Filed Feb. 5, 1938 3 Sheets-Sheet 2
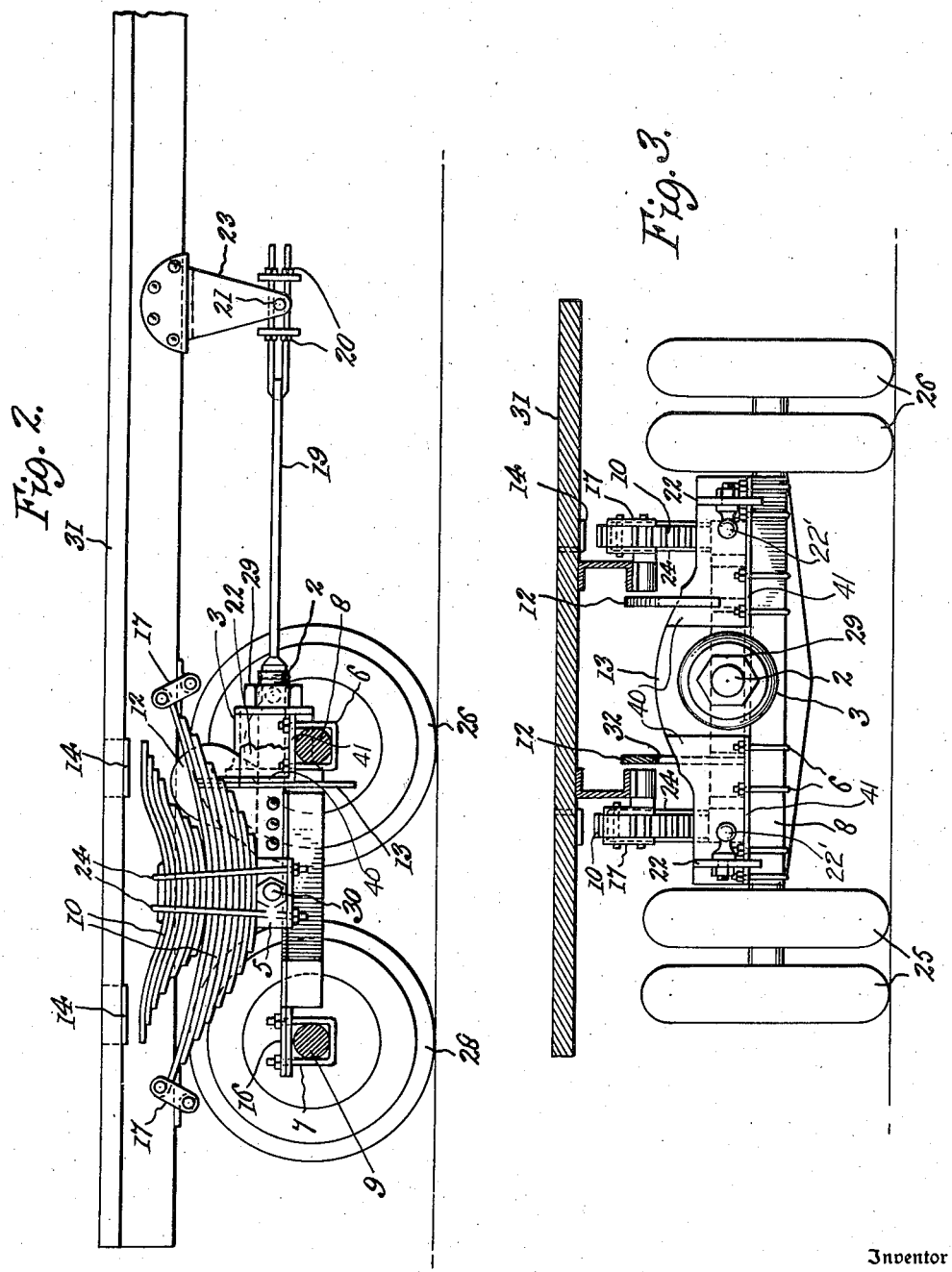
Inventor
Wilbert J. Hyatt
By Wilkinson & Mawhinney
Attorneys.

March 14, 1939. W. J. HYATT 2,150,604
TANDEM AXLE HOOK-UP
Filed Feb. 5, 1938 3 Sheets-Sheet 3

Inventor
Wilbert J. Hyatt
By Wilkinson & Mawhinney
Attorneys.

Patented Mar. 14, 1939

2,150,604

UNITED STATES PATENT OFFICE 2,150,604

TANDEM AXLE HOOK-UP

Wilbert John Hyatt, London, Ontario, Canada

Application February 5, 1938, Serial No. 188,857
In Canada January 14, 1938

4 Claims. (Cl. 280—124)

The present invention relates to improvements in equalizers for tandem-axle hook-ups and is for use on motor trucks, trailers, tractors or vehicles of any description which are equipped with tandem-axles.

According to prevailing practise such motor trucks as embody tandem-axles involve a rigid connection between the axles so that when one of the wheels rises to pass over a high spot on the road two of the wheels are lifted completely from the road surface and are during the interval of passing over the high spot not utilized to support the load.

It is an object of the present invention to provide a pivotal connection between the two axles such that all four wheels will at all times remain upon the road without regard to the passage of any individual wheel over a high spot.

Another object of the invention is to secure an even and uniform distribution of the load at all times over all four wheels of a tandem-axle assembly irrespective of any vertically raised position of an individual axle incident to passing over a high spot.

Another object of the invention is to so arrange and dispose the tandem-axle assembly and to so pivotally connect the two axles in reference to the chassis supporting springs that substantially all tilting of the chassis will be avoided even at periods when one or more of the wheels of the tandem assembly are passing over high or low spots in the roadway.

It is therefore a further object of the present invention to provide a construction of tandem-axle assembly and spring supporting structure which will maintain, or tend to maintain, the chassis level at all times, and at the same time insure an equal weight distribution on all four wheels.

The invention also has for an object to prevent the scuffing of tires when passing over curbs or high spots due to a lack of even weight on all wheels and resulting in a measure from the shifting movement of the spring shackles.

The objects of the invention are in general achieved by pivoting the two carrying axles together allowing of free tilting movement of each independently of the other in a substantial vertical direction transversely with respect to the direction of movement of the vehicle.

Such construction also has for its further object the eliminating of binding and scraping of the tires when negotiating curves, the pivotal connection between the two axles virtually constituting an equalizer.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a bottom plan view, with parts broken away and parts shown in section, of a vehicle shown equipped with the improved tandem-axle hook-up according to the present invention.

Figure 2 is a side elevation, with parts broken away and parts shown in section of the same.

Figure 3 is a vertical transverse section taken on the line 3—3 in Figure 1.

Figure 4:
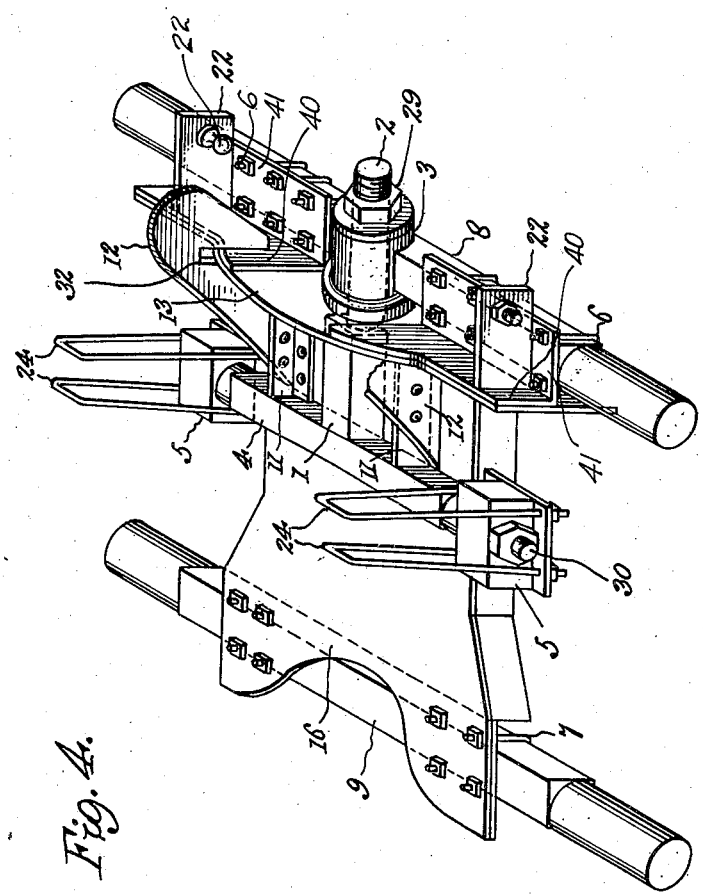
Figure 4 is a perspective view of the tandem-axle assembly disassociated from other parts of the vehicle.

The two axles are represented at 8 and 9 and they carry wheels 25, 26, 27 and 28. These wheels may be used singly or in pairs as shown in Figure 1 of the drawings. Either axle may be in front but for convenience in description the axle 8 will be referred to as the front axle and the axle 9 as the rear axle.

The axle 9 is rigidly secured to the rear end portion of a frame 16 as by the U-bolts 7. This frame is of substantial width to receive both of the side springs 10 including, if desired, the main and helper springs as illustrated in Figure 2; and such frame 16 is of substantial length in the direction of length of the vehicle so as to extend substantially the entire distance between the axles 8 and 9. The front end of the frame 16 is remote from the rear axle 9 and adjacent the front axle 8. At its front end the frame 16 carries a front bearing shaft 1. This shaft 1 is at a substantially central position of frame 16 and its axis lies substantially parallel with the longitudinal line of the vehicle. The axis of shaft 1 is substantially at right angles to the axes of the axles 8 and 9. The shaft 1 carries a projecting part 2 extending in advance of the forward edge of the frame 16 in a position to receive the hub 3 which is carried by the front axle 8, enabling the front axle to pivot about the frame 16; and likewise enabling the rear axle 9 and its rigidly connecting frame 16 to rotate about the hub 3. The shaft may be threaded if desired to receive a nut 29 whereby the hub 3 may be held to the frame 16.

A spring shaft or beam 4 extends transversely across, and is supported by, the frame 16. The ends of this beam extend laterally beyond the frame 16 and carry trunnions 30 about which freely pivot spring blocks 5. The blocks receive thereon the central portion of the springs 10, the springs being secured to the blocks 5 by the U-bolts 24 or by other suitable means. The ends of the springs 10 are connected by the shackles 17 to the body or chassis of the vehicle 31. The helper spring has its ends arranged to engage the spring pads 14 carried by the body or chassis 31.

A vertical plate 13 lies between axle 8 and the front end of frame 16, the vertical plate 13 being welded or otherwise affixed to the vertical webs 40 of angle irons. The horizontal webs 41 of such angle irons extend above axle 8 and are bolted thereto by the U-bolts 6. The vertical plate 13 and vertical webs 40 extend transversely of the vehicle and into guide slots 32 of guide plates 12. These guide plates are connected by bolts or other suitable fastenings 11 to the frame 16.

At 19 are shown torque rods having sockets at their rear ends for engaging over ball heads 22' to give a universal movement. The ball heads 22' are carried by plates 22 affixed to axle 8. At their front ends the torque rods are connected to any suitable form of adjusting devices whereby to shift the rods 19 either backwards or forwards. These adjusting devices, which form no part of the present invention, are indicated generally at 20 and are pivoted at 21 to dependent brackets 23 on the chassis 31.

In operation the load or chassis is supported through the springs 10 upon the central portion of the tandem-axle assembly as represented by the frame 16. Thus the weight is carried by all four wheels or all four pairs of wheels 25, 26, 27 and 28.

Should one of the front wheels, for instance the wheels 25 pass over a curb or high spot, the front axle 8 will rotate about shaft 1 without communicating any movement to the rear axle 9. Therefore the rear axle 9 will not be affected by this rising movement of wheels 25, and its rear wheels 27 and 28 will not be lifted from the road surface but will remain upon the road surface and will continue to equally and uniformly carry the load devolving through the springs 10.

In a similar way this raising movement of wheels 25 will not tend to lift the companion front wheels 26 off the roadway, the pivotal movement of the front axle 8 allowing the wheels 26 to remain in their accustomed place in contact with the roadway and receiving their share of the load through the springs 10. The wheels 25 which have undergone this rising movement will also be required to bear their share of the load. The same result occurs when the wheels 25 enter a depression. In such case the front axle 8 rotates in an opposite sense and all four wheels or all four pair of wheels remain in contact with the road and equalize the weight between them as normally is the case.

The lifting of either front wheel 25 or 26 and the accompanying tilting of front axle 8 will in a lesser degree lift shaft 1 and with it the front portion of frame 16, which action will be resisted by springs 10 so that the front wheels and the front axle 8 will be restored by springs 10 to original condition after a high spot has been passed. In thus tilting the forward end of frame 16 the spring blocks 5 will be allowed to remain stationary while the trunnions 30 rotate therein. This is for the purpose of preserving the spring alinement and preventing any torsional or twisting strains or any stresses from being communicated to the springs 10. The blocks 5 and trunnions 30 enable the springs 10 to assume, and continue to assume, an upright and correct position with respect to both axle assembly and chassis.

When a rear wheel 27 or 28 rises over a high spot, the frame 16 is naturally twisted according to the displacement of the wheel but such twisting movement merely causes shaft 1 or its extension 2 to rotate in hub 3 and the movement is not communicated to the front axle or the front wheels. This rising movement of either back wheel is resisted by springs 10 so that the springs communicate to all four wheels during this rise the same uniform distribution of load and require the wheel to return downwardly to the road surface after passing the obstruction. The lifting movement of either rear wheel will of course tend to lift frame 16 but the frame may rotate by the axle 9 rotating within wheels 27 and 28 so that shaft 1 may be kept down to a low position where the front wheels 25 and 26 will be equally on the ground. This is an advantage in having the shaft 1 at the forward part of frame 16 as remote as possible from axle 9 which is subjected to lifting which it is not desired to communicate to the front axle 8. Another reason for the long frame 16 is to receive the spring suspension at an intermediate point of this frame 16 whereby the load may be distributed to all four wheels simultaneously and equally; it being understood that the pivotal connection between the front and rear axles cannot coincide with the spring beam 4, as to do so would interfere with both the spring and the relative pivotal actions between the two load bearing axles.

As the front axle 8 oscillates about shaft 1, vertical plates 13 will move up and down in the slots 32 of guide plates 12. Thus the plates 12 do not interfere with the swinging movement of front axle 8 but the side walls of slots 32 form guides or bearings for the vertical plates 13 to prevent the axle 8 from being twisted or distorted about its axis since it would tend to shear off the shaft 1 or its extension 2. These guide plates 12 and 13 also resist any shearing moment set up in axle 1 and its extension 2 by reason of the lifting and twisting movement of frame 16 incident to displacement of rear axle 9.

It is obvious that various changes and modifications may be made in the details of construction and design of the above specifically described embodiment of this invention without departing from the spirit thereof, such changes and modifications being restricted only by the scope of the following claims.

What is claimed is:

1. In a vehicle, tandem axles, a frame rigidly secured to one axle and having its free end portion extending into proximity to the second axle, a pivotal connection between the central free end of the frame and said second axle, the axis of the pivotal connection extending at substantially right angles to the axes of said axles, a chassis, and spring supporting means for the chassis pivotally connected to said frame at the intermediate portion thereof.

2. In a vehicle, tandem axles, a frame rigidly secured to one axle and having its free end portion extending into proximity to the second axle, a pivotal connection between the central free end of the frame and said second axle, the axis of the pivotal connection extending at substantially right angles to the axes of said axles, a chassis, spring supporting means for the chassis pivotally connected to said frame at the intermediate portion thereof, and guide means between said frame and the second axle for guiding the tilting movement of the second axle about said pivot point and resisting twisting strains in said second axle.

3. In a vehicle, a tandem-axle assembly including front and rear axles, a frame secured at one end portion to said rear axle and having its forward end extending up close to the front axle, a shaft extending forwardly from the front free end of said frame at the approximate center line portion thereof, said front axle having a hub pivoting about said shaft, a chassis, and spring supporting means on the frame for supporting said chassis.

4. In a vehicle, a tandem-axle assembly comprising front and rear axles, a frame having its rear portion secured to said rear axle, a shaft extending from the free forward edge of said frame in an approximate center line position, a hub on said front axle rotatably received over said shaft, a guide plate extending up from said front axle, companion slotted guide plates on said frame at substantially right angles to the front axle guide plate and having the slots thereof receiving said front axle guide plate, a spring beam extending transversely across said frame at its transverse center line, said beam having trunnions, spring blocks received over said trunnions, a chassis, and spring means mounted on said blocks and connected to said chassis.

WILBERT JOHN HYATT.